(12) United States Patent
Wolfe et al.

(10) Patent No.: US 9,519,305 B2
(45) Date of Patent: *Dec. 13, 2016

(54) PROCESSOR CORE CLOCK RATE SELECTION

(71) Applicant: EMPIRE TECHNOLOGY DEVELOPMENT LLC, Wilmington, DE (US)

(72) Inventors: Andrew Wolfe, Los Gatos, CA (US); Thomas Conte, Atlanta, GA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 243 days.

This patent is subject to a terminal disclaimer.

(21) Appl. No.: 14/294,146

(22) Filed: Jun. 3, 2014

(65) Prior Publication Data

US 2014/0281657 A1    Sep. 18, 2014

Related U.S. Application Data

(63) Continuation of application No. 12/642,871, filed on Dec. 21, 2009, now Pat. No. 8,751,854.

(51) Int. Cl.
*G06F 1/04* (2006.01)
*G06F 11/34* (2006.01)
*G06F 1/08* (2006.01)
*G06F 9/48* (2006.01)

(52) U.S. Cl.
CPC . *G06F 1/04* (2013.01); *G06F 1/08* (2013.01); *G06F 11/34* (2013.01); *G06F 9/4881* (2013.01)

(58) Field of Classification Search
CPC ............... G06F 1/04; G06F 1/06; G06F 1/08; G06F 1/10; G06F 9/4881; G06F 9/50; G06F 9/505; G06F 9/5083; G06F 11/34; G06F 11/3433

See application file for complete search history.

(56) References Cited

U.S. PATENT DOCUMENTS 7,539,608 B1 * 5/2009 Dageville ........... G06F 11/3419
702/182
8,751,854 B2 * 6/2014 Wolfe ...................... G06F 1/08
713/500

(Continued)

OTHER PUBLICATIONS

Rao, R. et al., "Throughput of Multi-Core Processors Under Thermal Constraints," Consortium for Embedded Systems, International Symposium on Low Power Electronics and Design 2007, Aug. 27-29, 2007, pp. 201-206, Portland, Oregon, USA.

(Continued)

*Primary Examiner* — Thomas J Cleary
(74) *Attorney, Agent, or Firm* — Ren-Sheng International

(57) ABSTRACT

Techniques described herein generally relate to multi-core processors including two or more processor cores. Example embodiments may set forth devices, methods, and computer programs related to calculating a clock rate for one or more of the processor cores in the multi-core processor. One example method may include determining a first estimated workload for a first processor core and a second estimated workload for a second processor core within a scheduling interval in a periodic scheduling environment. In addition, a first clock rate for the first processor core may be calculated based on one or more of the first estimated workload, a maximum clock rate supported by the multi-core processor and/or the scheduling interval. Similarly, a second clock rate for the second processor core may also be calculated based on one or more of the second estimated workload, the maximum clock rate, and/or the scheduling interval.

25 Claims, 6 Drawing Sheets

(56) References Cited

U.S. PATENT DOCUMENTS

| | | | |
|---|---|---|---|
| 2003/0200059 A1* | 10/2003 | Ignatowski | G06F 11/3419 702/186 |
| 2006/0026447 A1 | 2/2006 | Naveh et al. | |
| 2008/0082844 A1 | 4/2008 | Ghiasi et al. | |
| 2008/0218225 A1 | 9/2008 | Shibayama et al. | |
| 2009/0064164 A1 | 3/2009 | Bose et al. | |
| 2009/0158061 A1 | 6/2009 | Schmitz et al. | |
| 2009/0172424 A1 | 7/2009 | Cai et al. | |
| 2009/0210740 A1 | 8/2009 | Huang et al. | |
| 2009/0313623 A1 | 12/2009 | Coskun et al. | |
| 2010/0037038 A1 | 2/2010 | Bieswanger et al. | |
| 2010/0057404 A1 | 3/2010 | Dittmann et al. | |
| 2010/0153700 A1* | 6/2010 | Capps, Jr. | G06F 9/3842 713/100 |
| 2010/0332883 A1 | 12/2010 | Saxe et al. | |
| 2011/0078340 A1* | 3/2011 | Kim | G11C 11/4082 710/18 |
| 2011/0080414 A1 | 4/2011 | Wang | |
| 2011/0154089 A1 | 6/2011 | Wolfe et al. | |

OTHER PUBLICATIONS

Kadin, M. et al., "Frequency and Voltage Planning for Multi-Core Processors Under Thermal Constraints," Division of Engineering, Brown University, IEEE International Conference on Computer Design, ICCD, 2008, pp. 463-470.

Mohammad Ghasemazar et al., "Minimizing the Power Consumption of a Chip Multiprocessor under an Average Throughput Constraint", 10th Int'l Symposium on Quality Electronic Design, IEEE, 2010.

Grigorios Magklis et al., "Dynamic Frequency and Voltage Scaling for a Multiple-Clock-Domain Microprocessor", IEEE Micro, Nov.-Dec. 2003, pp. 62-68, IEEE Computer Society.

Philo Juang et al., "Coordinated, Distributed, Formal Energy Management of Chip Multiprocessors", ACM. ISLPED'05, Aug. 8-10, 2005, pp. 127-130, San Diego, California, USA.

Wayne H. Cheng et al., "Dynamic Voltage and Frequency Scaling Circuits with Two Supply Voltages", IEEE, 2008, pp. 1236-1239.

Masaaki Kondo et al., "Improving Fairness, Throughput and Energy-Efficiency on a Chip Multiprocessor through DVFS", ACM SIGARCH Computer Architecture News, Mar. 2007, pp. 31-38, vol. 35, No. 1.

Sebastian Herbert et al., "Analysis of Dynamic Voltage/Frequency Scaling in Chip-Multiprocessors", ACM. ISLPED'07, Aug. 27-29, 2007, pp. 38-43, Portland, Oregon, USA.

Canturk Isci et al., "An Analysis of Efficient Multi-Core Global Power Management Policies: Maximizing Performance for a Given Power Budget", The 39th Annual IEEE/ACM International Symposium on Microarchitecture (MICRO'06), 2006, IEEE Computer Society.

* cited by examiner

200

| Task | Processor Core | Workload Type | Historical Data/ Suggestions | Estimated Workload | Measured Performance Data |
|---|---|---|---|---|---|
| Task$_a$ | Processor Core 202 | Type$_a$ | Reference Points$_a$ | X$_a$ | Y$_a$ |
| Task$_b$ | Processor Core 204 | Type$_b$ | Reference Points$_b$ | X$_b$ | Y$_b$ |
| Task$_c$ | Processor Core 206 | Type$_c$ | Reference Points$_c$ | X$_c$ | Y$_c$ |

500 A computer program product 502 at least one of one or more instructions for determining a first estimated workload for a first processor core in the multi-core processor by summing a first set of estimated workload for a first set of tasks assigned to the first processor core to execute within a scheduling interval in a periodic scheduling environment;

one or more instructions for determining a second estimated workload for a second processor core in the multi-core processor by summing a second set of estimated workload for a second set of tasks assigned to the second processor core to execute within the scheduling interval;

one or more instructions for calculating a first clock rate for the first processor core based on one or more of the first estimated workload, a maximum clock rate supported by the multi-core processor, and/or the scheduling interval; and/or one or more instructions for calculating a second clock rate for the second processor core based on one or more of the second estimated workload, the maximum clock rate, and/or the scheduling interval 504 a signal bearing medium 506 a communication medium 508 a computer readable medium 510 a recordable medium

PROCESSOR CORE CLOCK RATE SELECTION

CROSS REFERENCE TO RELATED APPLICATION

This application is a continuation under 35 U.S.C. §120 of U.S. patent application Ser. No. 12/642,871 filed on Dec. 21, 2009, now U.S. Pat. No. 8,751,854, which is incorporated herein by reference.

BACKGROUND

Description of the Related Art

Unless otherwise indicated herein, the approaches described in this section are not prior art to the claims in this application and are not admitted to be prior art by inclusion in this section.

A multi-core processor includes two or more independent processor cores arranged in an array. Each processor core in a conventional multi-core processor generally shares the same clock signal to simplify the interfaces between the processor cores. Each processor core may be assigned with tasks for every periodic time slice. However, when a group of the processor cores operate at the same operating frequency, some processor cores may complete the assigned tasks earlier than the others of the same group. Furthermore, the demand for the memory or cache resources shared by the processor cores may peak at the beginning of the time slice, which may cause delays in completing the assigned tasks.

BRIEF DESCRIPTION OF THE DRAWINGS

The foregoing and other features of the present disclosure will become more fully apparent from the following description and appended claims, taken in conjunction with the accompanying drawings. These drawings depict only example embodiments in accordance with the present disclosure and are therefore not to be considered limiting. The disclosure will be described with additional specificity and detail through use of the accompanying drawings.

FIG. 2 is a simplified table illustrating one or more factors that a workload estimator in a scheduler may rely upon to estimate workload for a task assigned to a processor core;

FIG. 5 is a schematic diagram illustrating a computer program product 500 for calculating a clock rate for one or more processor cores in a multi-core processor.

DETAILED DESCRIPTION

Figure 1:
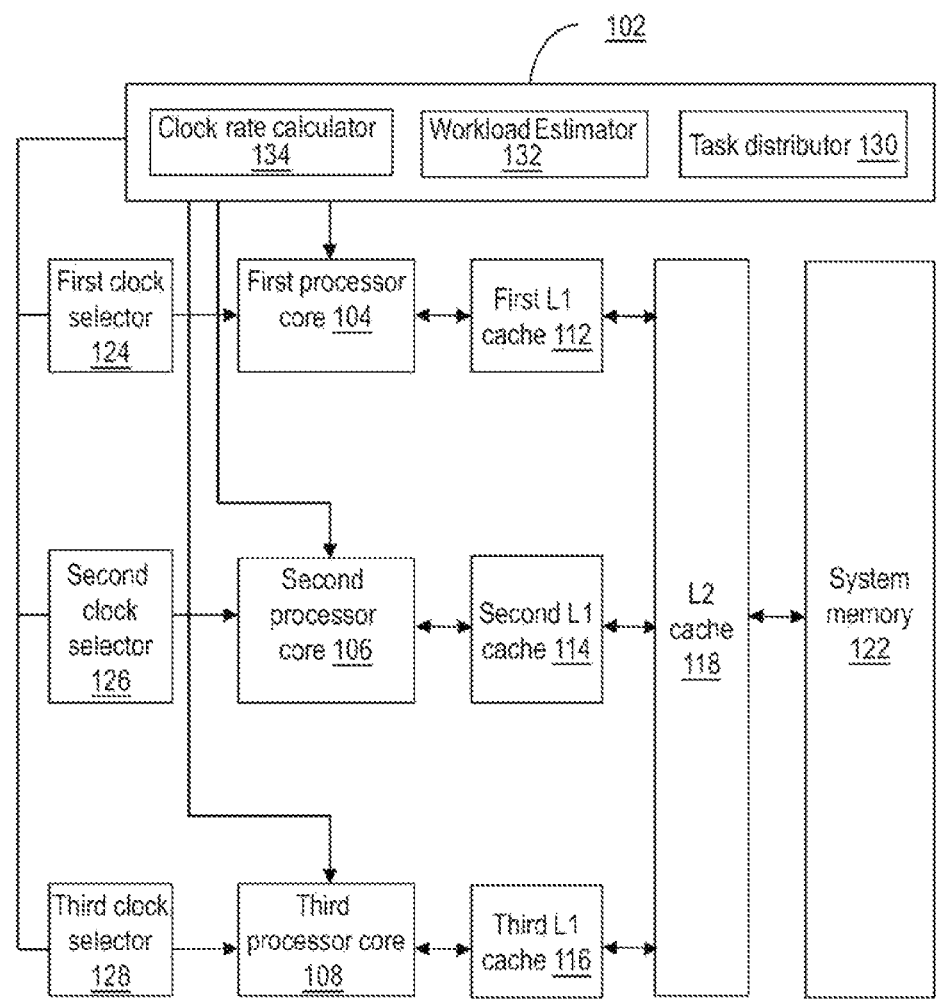
FIG. 1 is a simplified block diagram showing an example multi-core processor.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to devices, methods, and computer programs related to calculating a clock rate for one or more processor cores in a multi-core processor as will be described herein.

Techniques described herein generally relate to multi-core processors including two or more processor cores. Example embodiments may set forth devices, methods, and computer programs related to calculating a clock rate for one or more of the processor cores in the multi-core processor. One example method may include determining a first estimated workload for a first processor core and a second estimated workload for a second processor core within a scheduling interval in a periodic environment. In addition, a first clock rate for the first processor core may be calculated based on one or more of the first estimated workload, a maximum clock rate supported by the multi-core processor and/or the scheduling interval. Similarly, a second clock rate for the second processor core may also be calculated based on one or more of the second estimated workload, the maximum clock rate, and/or the scheduling interval.

FIG. 1 is a simplified block diagram showing an example multi-core processor 100, arranged in accordance with at least some embodiments of the present disclosure. The multi-core processor 100 may include a scheduler 102, a first processor core 104, a second processor core 106, a third processor core 108, and a memory system. The memory system may include L1 caches (e.g., a first L1 cache 112, a second L1 cache 114, and a third L1 cache 116), a L2 cache 118, and system memory 122. In some implementations, the first L1 cache 112, the second L1 cache 114, and the third L1 cache 116 may be coupled to the first processor core 104, the second processor core 106, and the third processor core 108, respectively.

In some implementations, the multi-core processor 100 may also include a first clock selector 124, a second clock selector 126, and a third clock selector 128. Each of the clock selectors may be configured to select a clock rate and/or a clock frequency for the processor core that it is coupled to. For example, the first clock selector 124 may be configured to select a first clock rate for the first processor core 104. Similarly, the second clock selector 126 may be configured to select a second clock rate for the second processor core 106, and the third clock selector 128 may be configured to select a third clock rate for the third processor core 108. Although the clock selectors are shown to be in the multi-core processor 100 in FIG. 1, the clock selectors in other implementations may be external to the multi-core processor 100. In still other implementations, a clock selector may be part of a processor core.

The scheduler 102 may include a task distributor 130, a workload estimator 132, and/or a clock rate calculator 134. In some implementations, the scheduler 102 may be performed by an operating system, a hypervisor, an application, or a hardware module. During a scheduling interval or time slice, the task distributor 130 may be configured to select a set of tasks from a task buffer (which may reside in the aforementioned memory system of the multi-core processor 100) and/or may be configured to assign one or more tasks from the set of tasks to be executed by one or more processor cores of the multi-core processor 100. A task may generally refer to a program, a process, a thread, or a portion thereof. In some implementations, the scheduler 102 may be configured to operate in a periodic scheduling environment, in which the same tasks may be repeatedly performed in a scheduling interval.

The workload estimator 132 may be configured to estimate the workload for a processor core to execute the tasks that have been assigned to the processor core during the scheduling interval. Based on the estimated workload, the clock rate calculator 134 may be configured to generate a calculated clock rate for the same processor core. Using the first processor core 104 as an example, after the workload estimator 132 determines the estimated workload for the first processor core 104 to execute all the tasks that have been assigned to it during a certain scheduling interval, the clock rate calculator 134 may generate a calculated clock rate for the first processor core 104. This calculated clock rate may be utilized by the clock selectors to select clock signals having certain clock frequencies to the processor cores. Subsequent paragraphs and drawings will further detail some operations of the workload estimator 132 and the clock rate calculator 134.

To estimate workload for an individual task, in some implementations, the workload estimator 132 may rely on a number of factors, such as, without limitation, historical data associated with a workload type of the task for a specific processor core, suggestions from a compiler regarding certain workload characteristics, and actual measured performance data. Some examples of a workload type may include, without limitation, numerically intensive workload, input/output processing workload, and others. Some examples of workload characteristics may include, cache miss ratio, burstiness, and others.

In one workload estimation example in a periodic scheduling environment, the workload estimator 132 may be configured to estimate the number of instructions required to complete a motion compensation task in a video system for one frame in one frame time interval (e.g., 1/60 of a second). The operations may include extracting information from a received data file header, such as the number of pixels in a frame, extracting historical data relating to the number of instructions needed per pixel to execute a motion estimation task to estimate an average number of instructions per pixel, and processing the extracted information to establish the estimate of the number of instructions. In another workload estimation example also in a periodic scheduling environment, the workload estimator 132 may be configured to estimate the amount of time required to calculate the reverse kinematics of a control surface in a fly-by-wire system. The operations may include extracting information relating to a number of floating pointing instructions needed for such a calculation, extracting historical data relating to average execution time per floating point instruction, and processing the extracted information to establish the estimated time. In a more sophisticated system, the number of cycles required to perform the reverse kinematics calculation in the past n scheduling intervals may be obtained, and the maximum number of cycles out of the n samples may be used as the estimated time.

In conjunction with FIG. 1, FIG. 2 is a simplified table 200 illustrating one or more factors that the workload estimator 132 in the scheduler 102 may rely upon to estimate workload for a task assigned to a processor core, arranged in accordance with at least some embodiments of the present disclosure. A processor core 202, a processor core 204, and a processor core 206 in the simplified table 200 may correspond to the first processor core 104, the second processor core 106, and the third processor core 108 of FIG. 1. $Task_a$ may refer to one or more individual tasks that the task distributor 130 may assign to the processor core 202. $Type_a$ may refer to the workload type of $Task_a$, and Reference $Points_a$ may refer to some historical data and/or suggestions for executing a task of $Type_a$ by the processor core 202. $X_a$ may refer to the estimated workload for executing $Task_a$ by the processor core 202, generally in terms of a number of clock cycles. $Y_a$ may refer to the actual measured performance data of completing the execution of $Task_a$ by the processor core 202. "a" may refers to a non-zero integer number.

Suppose a set of five tasks are assigned to the processor core 202 for execution within a scheduling interval. In this example, "a" may represent integer numbers in the range from 1 to 5. For each of the five tasks, the workload estimator 132 may be configured to utilize one or more of the workload type and/or the reference points to estimate the number of clock cycles that the processor core 202 may need to execute the task. In particular, the workload estimator 132 may be configured to look up the reference points associated with having the same processor core 202 execute the same $Type_1$ task and/or derive an averaged number of clock cycles from the reference points. The workload estimator 132 may use this averaged number of clock cycles to be the estimate workload, $X_1$. After $Task_a$ is executed, the scheduler 102 may also be configured to measure and/or record the number of clock cycles for the processor core 202 to complete executing $Task_1$. This actual number of clock cycles may be $Y_1$. The same process may be performed for the remaining four tasks.

In a similar fashion, the workload estimator 132 may be configured to estimate workload associated with executing $Task_b$ and $Task_c$ by the processor core 204 and the processor core 206, respectively. In some implementations, the measured performance data in the simplified table 200 may become a part of the historical data/suggestions and/or may become a factor for the scheduler 102 to consider in establishing a compensation weight for the clock calculator 134. This compensation weight may be utilized to compensate for inaccuracies between the estimated workload and/or the measured performance data. Subsequent paragraphs and drawings may provide additional descriptions and examples.

Figure 3:
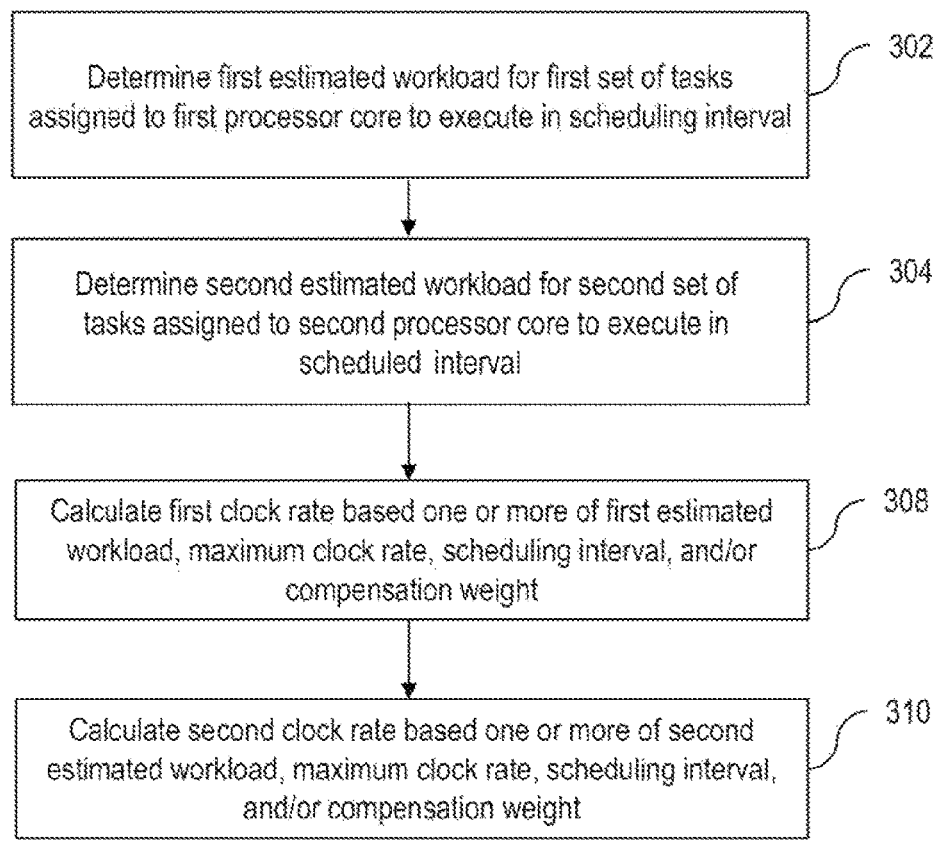
FIG. 3 is a flow chart illustrating a method of calculating a clock rate for a processor core in a multi-core processor.

FIG. 3 is a flow chart illustrating a method 300 of calculating a clock rate for a processor core in a multi-core processor, arranged in accordance with at least some embodiments of the present disclosure. Method 300 may include one or more operations, functions or actions as illustrated by one or more of blocks 302, 304, 308, and/or 310. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for method 300 may begin at block 302, "Determine first estimated workload for first set of tasks assigned to first processor core to execute in scheduling interval." Block 302 may be followed by block 304, "Determine second estimated workload for second set of tasks assigned to second processor core to execute in scheduled interval." Block 304 may be followed by block 308, "Calculate first clock rate based one or more of first estimated workload, maximum clock rate, scheduling interval, and/or compensation weight." Block 308 may be followed by block 310, "Calculate second clock rate based one or more of second estimated workload, maximum clock rate, scheduling interval, and/or compensation weight."

In block 302, method 300 may be arranged to sum all the estimated workload for the first set of tasks assigned to the first processor core to execute within a scheduling interval to come up with the first estimated workload of the first processor core.

In block 304, the second estimated workload for the second processor core may also be determined by summing all the estimated workload for the second set of tasks assigned to the second processor core to execute within the same scheduling interval.

In blocks 308 and/or 310, different clock rates may be calculated for different processor cores. In some implementations, the maximum clock rate can refer to a maximum clock rate supported by the multi-core processor. Also, the clock rate calculation may be based on the following equation (1):

$$C_i = \min\left(C_{max}, k\left(\frac{W_i}{T_s}\right)\right), \qquad (1)$$

where $C_i$ refers to the calculated clock rate for $i^{th}$ processor core; k refers to the compensation weight for the $i^{th}$ processor core; $W_i$ refers to the estimated workload for the $i^{th}$ processor core; $T_s$ refers to the duration of a scheduling interval, and $C_{max}$ is the maximum clock rate supported by the multi-core processor.

The compensation weight mentioned above may be a safety factor to compensate for potential inaccuracies associated with the estimated workload. The compensation weight may be determined based on a difference between a measured workload and an estimated workload. In some implementations, the measured workload may relate to the number of cycles needed to execute a set of tasks within the last 50 scheduling intervals. For example, the standard deviation of the execution time of the last 50 scheduling intervals may be calculated and maintained, and the compensation weight may be set to be an integer multiple (e.g., 3) standard deviations from the mean. In other implementations, the ratios between a first measured workload for the last 50 scheduling intervals and a first estimated measured workload may be calculated and maintained, and the compensation weight may be set to be the maximum of these ratios. The first measured workload may refer to a measured number of clock cycles that the first processor core uses to complete executing all the tasks assigned to the first processor core, and the first estimated workload may refer to an estimated number of clock cycles that the first processor core may need to complete executing its assigned tasks. In addition, a second estimated workload and a second measured workload associated with a second processor core may also be considered. In other words, multiple compensation weights may be determined for the multiple processor cores. Using the first estimated workload and the first measured workload as an illustration, when the first measured workload exceeds the first estimated workload, the compensation weight may be set to be higher than 1 (e.g., 1.05), so that the calculated clock rate based on the first estimated workload may be increased. On the other hand, when the first estimated workload is highly accurate (e.g., equal to or almost equal to the first measured workload) the compensation weight may be set to or maintained to be equal to or close to 1.

According equation (1), when a processor core is assigned to more tasks than the processor core is able to complete within the scheduling interval (e.g., $T_a$), then the processor core can be configured to operate at the maximum clock rate supported by the multi-core processor (e.g., $C_{max}$). Otherwise, the calculated clock rate for the processor core can be based on the estimated workload for the processor core, the scheduling interval, and/or the compensation weight.

Figure 4:
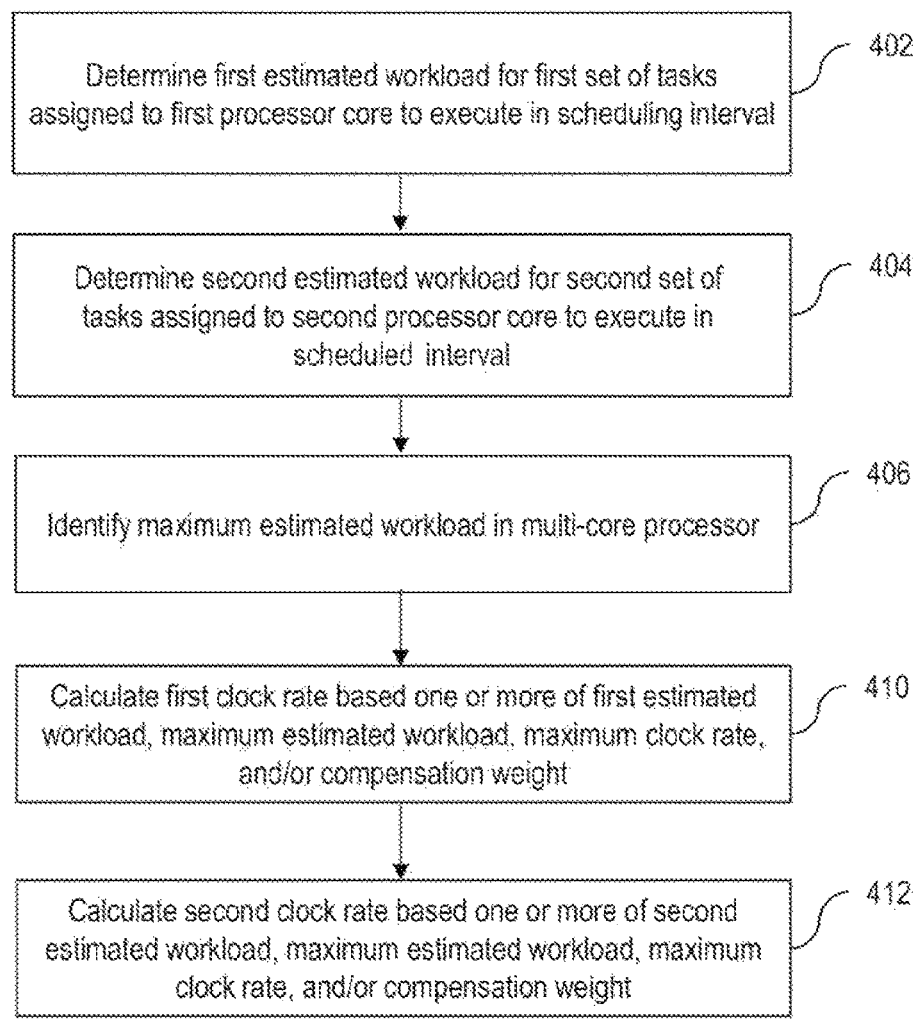
FIG. 4 is a flow chart illustrating another method of calculating a clock rate for a processor core in a multi-core processor.

FIG. 4 is a flow chart illustrating another method, a method 400, of calculating a clock rate for a processor core in a multi-core processor, arranged in accordance with at least some embodiments of the present disclosure. Method 400 may include one or more operations, functions or actions as illustrated by one or more of blocks 402, 404, 406, 410, and/or 412. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for method 400 may begin at block 402, "Determine first estimated workload for first set of tasks assigned to first processor core to execute in scheduling interval." Block 402 may be followed by block 404, "Determine second estimated workload for second set of tasks assigned to second processor core to execute in scheduled interval". Block 404 may be followed by block 406, "Identify maximum estimated workload in multi-core processor." Block 406 may be followed by block 410, "Calculate first clock rate based one or more of first estimated workload, maximum estimated workload, maximum clock rate, and/or compensation weight." Block 410 may be followed by block 412, "calculate second clock rate based one or more of second estimated workload, maximum estimated workload, maximum clock rate, and/or compensation weight."

In block 402, method 400 may be arranged to sum all the estimated workload for the first set of tasks assigned to the first processor core to execute within a scheduling interval to come up with the first estimated workload of the first processor core.

In block 404 the second estimated workload for the second processor core may also be determined by summing all the estimated workload for the second set of tasks assigned to the second processor core to execute within the same scheduling interval.

In block 406 the estimated workloads for all the processor cores in the multi-core processor are compared to identify the maximum estimated workload.

In block 410, and block 412 different clock rates can be calculated for different processor cores. In some implementations, the clock rate calculation may be based on the following equation (2):

$$C_i = k\left(\frac{W_i}{W_{max}}\right)C_{max}, \qquad (2)$$

where $C_i$ refers to the calculated clock rate for $i^{th}$ processor core; k refers to the compensation weight for the $i^{th}$ processor core; $W_i$ refers to the estimated workload for the $i^{th}$ processor core; $W_{max}$ refers to the maximum estimated workload for a processor core in the multi-core processor; and $C_{max}$ refers to the maximum clock rate supported by the multi-core processor. In some other implementations, instead of staying as a constant value, k may vary per processor core.

Therefore, according to equation (2), the calculated clock rate (e.g., $C_i$) for a processor core can be proportionally set as a percentage of the maximum estimated workload (e.g., $W_{max}$) with regard to the estimated workload for the processor core (e.g., $W_i$).

FIG. 5 is a schematic diagram illustrating a computer program product 500 for calculating a clock rate for one or more processor cores in a multi-core processor, arranged in accordance with at least some embodiments of present disclosure. The computer program product 500 may include one or more sets of executable instructions 502 for executing the methods described above and also illustrated in FIG. 2, FIG. 3, and FIG. 4. The computer program product 500 may be transmitted in a signal bearing medium 504 or another similar communication medium 506. The computer program product 500 may also be recorded in a computer readable medium 508 or another similar recordable medium 510.

Figure 6:
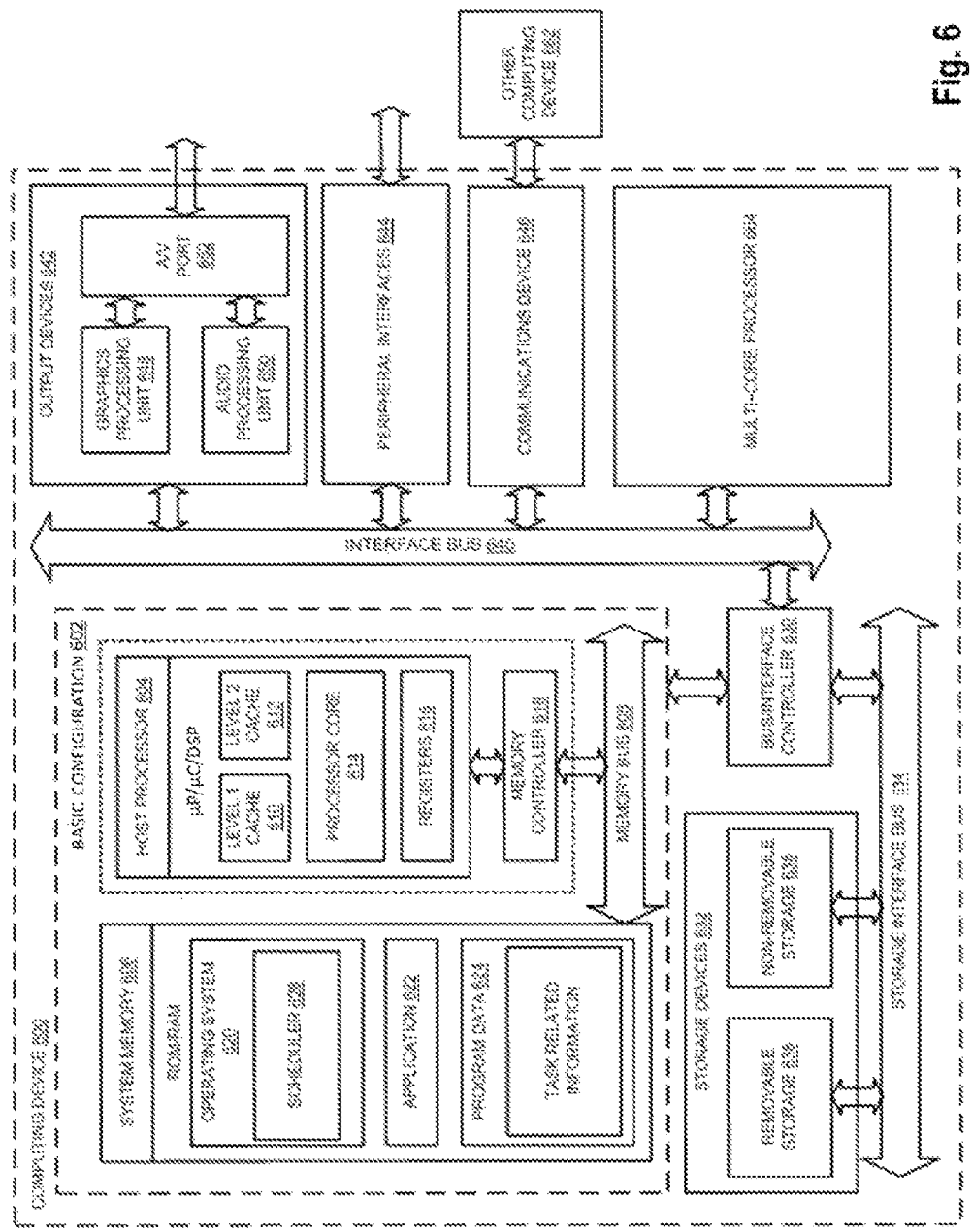
FIG. 6 is a block diagram of an example computing device having a multi-core processor and a host processor; all arranged in accordance with at least some embodiments of present disclosure.

FIG. 6 is a block diagram of an example computing device having a multi-core processor and a host processor, arranged in accordance with at least some embodiments of the present disclosure. In a very basic configuration, computing device 600 typically includes one or more host processors 604 and a system memory 606. A memory bus 608 may be used for communicating between host processor 604 and system memory 606.

Depending on the desired configuration, host processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. In some implementations, the operating system 620 may include a scheduler 626, which may correspond to the scheduler 102 shown in FIG. 1 and may be arranged to perform the functions as described herein including those described with respect to at least method 300 of FIG. 3 and method 400 of FIG. 4. Alternatively, application 622 may include the scheduler 626 (not shown in FIG. 6) may be arranged to operate with program data 624 on operating system 620. Program data 624 may include task related information, such as, without limitation, a task buffer including a set of task for the scheduler 626 to distribute to the one or more processor cores in the multi-core processor 664, the information shown in the simplified table 200 of FIG. 2 that the scheduler 626 may rely upon to estimate workload for the one or more tasks assigned to one or more processor cores in the multi-core processor 664 during a scheduling interval, and others. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller or a parallel interface controller, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller, which may be arranged to facilitate communications with one or more other computing devices 662 over a network communication link via one or more communication ports. In some implementations, computing device 600 includes a multi-core processor 664, which may communicate with the host processor 604 through the interface bus 640.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

There is little distinction left between hardware and software implementations of aspects of systems. The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes, systems, or other technologies are deployed. For example, if an implementer determines that speed and accuracy are paramount, the implementer may opt for a mainly hardware or firmware vehicle. If flexibility is paramount, the implementer may opt for a mainly software implementation. Yet again, alternatively, the implementer may opt for some combination of hardware, software, with or without firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method to calculate a clock rate for processor cores in a multi-core processor, the method comprising:
    generating a first set of estimated workloads for a first set of tasks, which are assigned to a first processor core in the multi-core processor, by obtaining first information related to one or more of first workload type and first workload characteristics associated with the first set of tasks, obtaining first historical data related to the first workload type, and calculating the first set of estimated workloads based on the obtained first information and the obtained first historical data;
    determining a first estimated workload for the first processor core as a sum of the first set of estimated workloads;
    generating a second set of estimated workloads for a second set of tasks, which are assigned to a second processor core in the multi-core processor, by obtaining second information related to one or more of second workload type and second workload characteristics associated with the second set of tasks, obtaining second historical data related to the second workload type, and calculating the second set of estimated workloads based on the obtained second information and the obtained second historical data;
    determining a second estimated workload for the second processor core as a sum of the second set of estimated workloads; and
    calculating a first clock rate for the first processor core partly based on the first estimated workload and calculating a second clock rate for the second processor core partly based on the second estimated workload.

2. The method of claim 1, wherein the first workload characteristics associated with the first set of tasks are associated with a suggestion from a compiler.

3. The method of claim 1, wherein generating the first set of estimated workloads for the first set of task is further performed by obtaining a first actual measured performance data.

4. The method of claim 1, further comprising determining a first compensation weight based on the first estimated workload and a first measured workload to complete execution of the first set of tasks within a scheduling interval, wherein the calculating the first clock rate for the first processor core is further based on the first compensation weight.

5. The method of claim 4, further comprising maintaining the first compensation weight close to about 1 in response to the first estimated workload being determined to closely match the first measured workload.

6. The method of claim 4, further comprising increasing the first compensation weight based on an amount by which the first estimated workload exceeds the first measured workload.

7. The method of claim 4, further comprising determining a second compensation weight based on the second estimated workload and a second measured workload to complete execution of the second set of tasks within the scheduling interval, wherein the calculating the second clock rate for the second processor core is further based on the second compensation weight.

8. The method of claim 1, further comprising identifying a maximum estimated workload in the multi-core processor based on a comparison between the first estimated workload and the second estimated workload, wherein the calculating the first clock rate for the first processor core and the calculating the second clock rate for the second processor core are further based on the maximum estimated workload.

9. The method of claim 8, wherein the calculating the first clock rate further comprises applying a first ratio between the first estimated workload and the maximum estimated workload to the maximum clock rate supported by the multi-core processor.

10. The method of claim 8, wherein the calculating the second clock rate comprises applying a second ratio between the second estimated workload and the maximum estimated workload to a maximum clock rate supported by the multi-core processor.

11. The method of claim 8, further comprising determining a first compensation weight based on the first estimated workload and a first measured workload to complete execution of the first set of tasks within a scheduling interval, wherein the calculating the first clock rate for the first processor core is further based on the first compensation weight.

12. The method of claim 11, further comprising maintaining the first compensation weight close to about 1 in response to the first estimated workload being determined to closely match the first measured workload.

13. The method of claim 11, further comprising increasing the first compensation weight based on an amount by which the first estimated workload exceeds the first measured workload.

14. The method of claim 1, further comprising:
configuring a first clock selector to output a first clock signal associated with the first clock rate to the first processor core; and
configuring a second clock selector to output a second clock signal associated with the second clock rate to the second processor core.

15. A non-transitory computer readable medium that includes instructions stored thereon to calculate a clock rate for a first processor core and a second processor core in a multi-core processor, the instructions which in response to execution by a host processor, cause the host processor to perform or control performance of:
generate a first set of estimated workloads for a first set of tasks, which are assigned to a first processor core in the multi-core processor, by extraction of first information related to one or more of first workload type and first workload characteristics associated with the first set of tasks, extraction of first historical data related to the first workload type, and calculation of the first set of estimated workloads based on the extracted first information and the extracted first historical data;
determine a first estimated workload for the first processor core by use of the first set of estimated workloads;
generate a second set of estimated workloads for a second set of tasks, which are assigned to a second processor core in the multi-core processor, by extraction of second information related to one or more of second workload type and second workload characteristics associated with the second set of tasks, extraction of second historical data related to the second workload type, and calculation of the second set of estimated workloads based on the extracted second information and the extracted second historical data;
determine a second estimated workload for the second processor core by use of the second set of estimated workloads; and
calculate a first clock rate for the first processor core partly based on the first estimated workload and calculate a second clock rate for the second processor core partly based on the second estimated workload.

16. The non-transitory computer readable medium of claim 15, wherein the first workload characteristics associated with the first set of tasks are associated with a suggestion from a compiler.

17. The non-transitory computer readable medium of claim 15, further including additional instructions, which in response to execution by the host processor, cause the host processor to perform or control performance of:
determine a first compensation weight based on the first estimated workload and a first measured workload to complete execution of the first set of tasks within a scheduling interval; and
calculate the first clock rate for the first processor core further based on the first compensation weight.

18. The non-transitory computer readable medium of claim 15, further including additional instructions, which in response to execution by the host processor, cause the host processor to perform or control performance of:
identify a maximum estimated workload in the multi-core processor based on a comparison between the first estimated workload and the second estimated workload; and
calculate the first clock rate for the first processor core and calculate the second clock rate for the second processor core further based on the maximum estimated workload.

19. The non-transitory computer readable medium of claim 18, further including additional instructions, which in response to execution by the host processor, cause the host processor to perform or control performance of:
apply a first ratio, which is between the first estimated workload and the maximum estimated workload, to a maximum clock rate supported by the multi-core processor to calculate the first clock rate.

20. The non-transitory computer readable medium of claim 18, further including additional instructions, which in response to execution by the host processor, cause the host processor to perform or control performance of:
determine a first compensation weight based on the first estimated workload and a first measured workload to complete execution of the first set of tasks within a scheduling interval; and
calculate the first clock rate for the first processor core based also on the first compensation weight.

21. The non-transitory computer readable medium of claim 15, further including additional instructions, which in response to execution by the host processor, cause the host processor to perform or control performance of:
configure a first clock selector to output a first clock signal associated with the first clock rate to the first processor core; and
configure a second clock selector to output a second clock signal associated with the second clock rate to the second processor core.

22. A computer device, comprising:
a multi-core processor including a first processor core and a second processor core;
a first clock selector and a second clock selector, wherein the first clock selector is coupled to the first processor core, and the second clock selector is coupled to the second processor core;
wherein:
a first set of estimated workloads for a first set of tasks assigned to the first processor core in the multi-core processor is generated by extraction of first information related to one or more of first workload type and first workload characteristics associated with the first set of tasks, extraction of first historical data related to the first workload type, and calculation of the first set of estimated workloads based on the extracted first information and the extracted first historical data;
a second set of estimated workloads for a second set of tasks assigned to the second processor core in the multi-core processor is generated by extraction of second information related to one or more of second workload type and second workload characteristics associated with the second set of tasks, extraction of second historical data related to the second workload type, and calculation of the second set of estimated workloads based on the extracted second information and the extracted second historical data,
wherein the first clock selector is configured to output a first clock signal associated with a first clock rate to the first processor core based at least in part on the first set of estimated workloads; and
wherein the second clock selector is configured to output a second clock signal associated with a second clock rate to the second processor core based at least in part on the second set of estimated workloads.

23. The computer device of claim 22, wherein the first processor core is configured to operate at the first clock rate, calculated based on a sum of the first set of estimated workloads, selected by the first clock selector.

24. The computer device of claim 22, wherein the first processor core is configured to operate at the first clock rate, calculated based on:
- a maximum estimated workload in the multi-core processor identified by a comparison between a sum of the first set of estimated workloads and a sum of the second set of estimated workloads; or
- a compensation weight determined based on one or more of the sum of the first set of estimated workloads, the sum of the second set of estimated workloads, a first measured workload to complete execution of the first set of tasks, and a second measured workload to complete execution of the second set of tasks.

25. The computer device of claim 24, wherein the first clock rate is calculated based on application of a first ratio, between the sum of the first set of estimated workloads and the maximum estimated workload, to a maximum clock rate supported by the multi-core processor.

* * * * *

UNITED STATES PATENT AND TRADEMARK OFFICE
CERTIFICATE OF CORRECTION

PATENT NO. : 9,519,305 B2  
APPLICATION NO. : 14/294146  
DATED : December 13, 2016  
INVENTOR(S) : Wolfe et al.

Page 1 of 1

It is certified that error appears in the above-identified patent and that said Letters Patent is hereby corrected as shown below:

In Column 1, Line 4, delete "CROSS REFERENCE" and insert -- CROSS-REFERENCE --, therefor.

In Column 1, Line 7, delete "§120" and insert -- § 120 --, therefor.

In Column 6, Line 3, delete "(e.g., Ta)," and insert -- (e.g., Ts), --, therefor.

Signed and Sealed this  
Eighteenth Day of April, 2017

Michelle K. Lee  
*Director of the United States Patent and Trademark Office*